(12) United States Patent
Naito

(10) Patent No.: US 8,221,849 B2
(45) Date of Patent: Jul. 17, 2012

(54) PROCESS FOR PRODUCING SELF-SEALING PNEUMATIC TIRE AND APPARATUS THEREFOR

(75) Inventor: Mitsuru Naito, Kanagawa (JP)

(73) Assignee: The Yokohoma Rubber Co., Ltd., Tokyo (JP)

(*) Notice: Subject to any disclaimer, the term of this patent is extended or adjusted under 35 U.S.C. 154(b) by 444 days.

(21) Appl. No.: 12/664,092

(22) PCT Filed: Jul. 18, 2008

(86) PCT No.: PCT/JP2008/062998
§ 371 (c)(1),
(2), (4) Date: Dec. 11, 2009

(87) PCT Pub. No.: WO2009/014082
PCT Pub. Date: Jan. 29, 2009

(65) Prior Publication Data
US 2010/0218883 A1    Sep. 2, 2010

(30) Foreign Application Priority Data
Jul. 24, 2007  (JP) .................................. 2007-192133

(51) Int. Cl.
*C08F 2/46* (2006.01)

(52) U.S. Cl. ........ 427/496; 427/553; 427/233; 427/240; 427/407.1; 427/551; 427/508

(58) Field of Classification Search .................. None
See application file for complete search history.

(56) References Cited

U.S. PATENT DOCUMENTS

| | | | | |
|---|---|---|---|---|
| 3,935,893 A | * | 2/1976 | Stang et al. | 152/504 |
| 4,057,090 A | * | 11/1977 | Hoshikawa et al. | 152/504 |
| 4,228,839 A | * | 10/1980 | Bohm et al. | 152/504 |
| 4,262,624 A | * | 4/1981 | Soeda et al. | 118/44 |
| 4,418,093 A | * | 11/1983 | Gomberg et al. | 427/8 |

(Continued)

FOREIGN PATENT DOCUMENTS

JP    61-229604 A    10/1986

(Continued)

*Primary Examiner* — Timothy Meeks
*Assistant Examiner* — Michael P Rodriguez
(74) *Attorney, Agent, or Firm* — Carrier Blackman & Associates, P.C.; Joseph P. Carrier; William D. Blackman

(57) ABSTRACT

A process in which a self-sealing pneumatic tire consisting of a pneumatic tire after vulcanization molding furnished with a sealant layer being uniform without thickness irregularity and a cover sheet layer therefore is produced without the use of an organic solvent and expensive apparatus; and an apparatus therefore. The process is characterized by sequentially performing the operations of injecting a viscous sealant material onto the internal surface of a pneumatic tire (T) after vulcanization molding; diffusing the sealant material into a sheet form by centrifugal force while rotating the pneumatic tire (T) around the tire axis to thereby form a sealant layer (11); injecting a cover material of uncured rubber material or resin material onto the inside surface of the sealant layer (11); diffusing the cover material into a sheet form by centrifugal force while rotating the pneumatic tire (T) around the tire axis to thereby form a cover sheet layer (12); and irradiating the cover sheet layer (12) with electron beams, infrared rays, ultraviolet rays or ultrasonic waves to thereby harden the same.

6 Claims, 2 Drawing Sheets

U.S. PATENT DOCUMENTS

| | | | |
|---|---|---|---|
| 4,424,295 A * | 1/1984 | Van Ornum et al. | 524/526 |
| 4,958,587 A * | 9/1990 | Fogal et al. | 118/206 |
| 6,508,898 B1 * | 1/2003 | Rustad et al. | 156/115 |
| 2003/0230369 A1 * | 12/2003 | Domer et al. | 152/504 |
| 2004/0149366 A1 * | 8/2004 | Makino et al. | 152/505 |
| 2004/0173297 A1 | 9/2004 | Fukutomi et al. | |
| 2004/0238090 A1 | 12/2004 | Ueda et al. | |
| 2006/0148927 A1 * | 7/2006 | Hirose | 523/166 |

FOREIGN PATENT DOCUMENTS

| | | |
|---|---|---|
| JP | 11-254547 A | 9/1999 |
| JP | 2000-247122 A | 9/2000 |
| JP | 2001-212885 A | 8/2001 |
| JP | 2003-072329 | 3/2003 |
| JP | 2003-154823 A | 5/2003 |
| WO | WO 2009006915 A1 * | 1/2009 |

* cited by examiner

US 8,221,849 B2

PROCESS FOR PRODUCING SELF-SEALING PNEUMATIC TIRE AND APPARATUS THEREFOR

TECHNICAL FIELD

The present invention relates to a process for producing a self-sealing pneumatic tire and an apparatus therefor. More specifically, the present invention relates to a process of producing a self-sealing pneumatic tire and an apparatus therefor, which can produce a pneumatic tire with a sealant layer that is uniform, without thickness irregularity on the internal surface of the tire, as well as a cover sheet layer therefor, without using organic solvents or a high precision thickness control apparatus.

BACKGROUND ART

Japanese Patent Application Publication Kokai 2003-72329 proposes a production process for a pneumatic tire with a puncture preventing function by which a rubber layer containing a peroxide and a rubber layer not containing a peroxide are applied on the internal surface of an unvulcanized tire prior to vulcanization molding. The tire is then vulcanized so that the first rubber layer is decomposed by the peroxide to form a sealant layer while the second rubber layer forms a cover sheet layer that covers the sealant layer.

However, with this production method, when the rubber component that forms the sealant layer is decomposed by the peroxide, a large quantity of decomposition gas is generated. Because this decomposition gas is retained between the sealant layer and the cover sheet layer, the sealant layer becomes nonuniform. Consequently, a process of removing the gas after vulcanization molding is required, leading to problems with inferior productivity.

Forming a sealant layer and a cover sheet layer on the pneumatic tire after vulcanization molding is useful in order to eliminate the need for this gas removal process. However, the viscosity of the sealant material is high, so an organic solvent must be added to the sealant material to decrease the viscosity and make handling easier in order to apply it as a uniform sheet onto the internal surface of the tire. As a result, an inconvenient process of removing the solvent is required after applying the sealant material to the internal surface of the tire, and if there is residual organic solvent, there will be safety problems associated with evaporation when the tire is in use. Furthermore, if the sealant material is applied without using an organic solvent, a high-pressure apparatus is required in order to apply the high viscosity sealant material in a strip, or a high precision control apparatus is required to perform a complicated operation using a nozzle that sprays sealant in order to form a uniform sheet on the internal surface of the tire, and therefore there is a problem of increased production costs.

DISCLOSURE OF THE INVENTION

Problem to be Solved by the Invention

An objective of the present invention is to provide a process and an apparatus for producing a self-sealing pneumatic tire that can be produced easily without the use of organic solvents or expensive equipment, when producing a self-sealing pneumatic tire with a uniform sealant layer without thickness irregularity and a cover sheet layer therefor, on a pneumatic tire after vulcanization molding.

SUMMARY OF THE INVENTION

A method of producing the self-sealing pneumatic tire of the present invention that achieves the aforementioned objective includes injecting a viscous sealant material onto the internal surface of the pneumatic tire after vulcanization molding, and diffusing the sealant material into a sheet form by centrifugal force while rotating the pneumatic tire around the tire axis to thereby form a sealant layer. Subsequently, a cover material of uncured rubber material or resin material is injected onto the inside surface of the sealant layer, and the cover material is then diffused into a sheer form by centrifugal force while rotating the pneumatic tire around the tire axis to thereby form a cover sheet layer. The cover sheet layer is then irradiated with electron beams, infrared rays, ultraviolet rays, or ultrasonic waves to thereby harden the same.

If the rotational speed of the pneumatic tire is set between 650 and 1800 rpm, and, in addition, the viscosity of the sealant material and the cover material is between 100 and 5000 Pa·s, a uniform sheet can be favorably formed by centrifugal force. Furthermore, if the specific gravity of the sealant material is higher than the specific gravity of the cover material, a stable interface can be formed between the sealant layer and the cover layer.

The thickness of the cover sheet layer is preferably set between ⅕ and ½ that of the sealant layer, and thereby the sealant layer can be stably maintained on the internal surface of the tire. Furthermore, the method of injecting the sealant material onto the internal surface of the tire may be a method of first powdering the sealant material by freeze pulverizing, and then spray injecting the same.

The apparatus for producing the self-sealing pneumatic tire of the present invention that achieves the aforementioned objective includes a rotational drive apparatus that grasps the vulcanization molded pneumatic tire and rotates the pneumatic tire around the tire axis. A spray nozzle for sealant material, a spray nozzle for cover material, and an irradiation means for irradiating electron beams, infrared rays, ultraviolet rays, or ultrasonic waves are also provided on the lateral part of the pneumatic tire that is grasped by the rotational drive apparatus so as to move in and out of the cavity of the pneumatic tire.

Effect of the Invention

With the production method of the present invention, the viscous sealant material and unvulcanized cover material that are injected onto the internal surface of the vulcanization molded pneumatic tire are diffused into a sheet form by the centrifugal force while rotating the pneumatic tire around the tire axis. The sealant layer and coversheet layer can thereby be formed with uniform thickness in the circumferential direction of the tire. The coversheet layer is then hardened by irradiating with an electron beam, infrared rays, ultraviolet rays, or ultrasonic waves, so a sealant layer and cover sheet layer with uniform thickness can be formed on the internal surface of the tire without using organic solvents or a high precision apparatus.

Furthermore, the production apparatus of the present invention can perform the aforementioned production method of the present invention smoothly.

BRIEF DESCRIPTION OF THE DRAWINGS

FIGS. 2A-C are explanatory diagrams schematically showing the process of the production method of a self-sealing pneumatic tire according to the present invention, wherein FIG. 2A illustrates the sealant material injection process, FIG. 2B illustrates the cover material injection process, and FIG. 2C illustrates the cover sheet layer hardening process.

Figure 1:
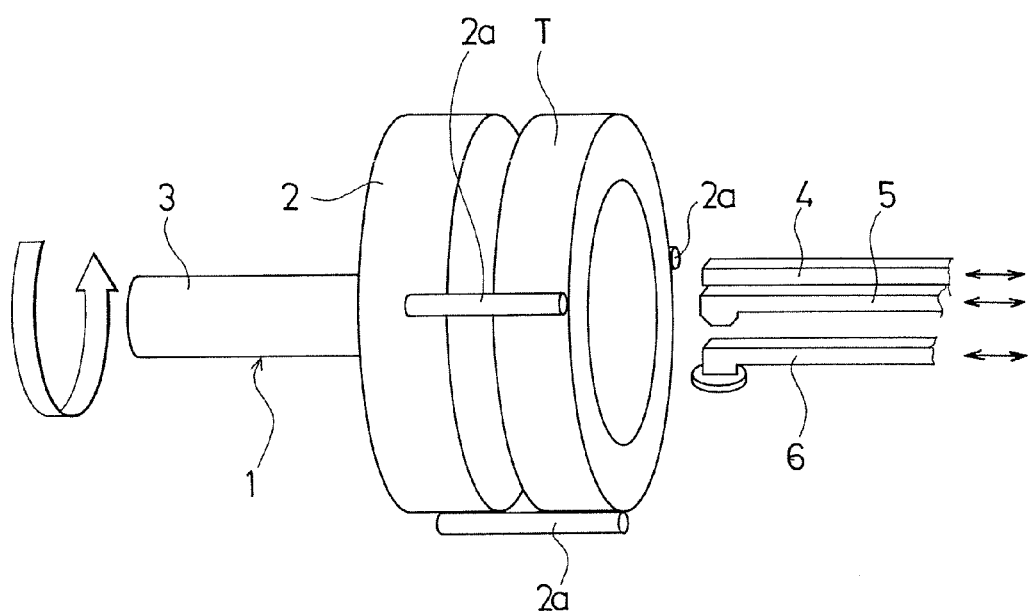
FIG. 1 is an explanatory diagram schematically showing an example of an embodiment of the production apparatus for a pneumatic tire according to the present invention.

REFERENCE NUMERALS 1 rotational drive apparatus
4 spray nozzle for sealant material
5 spray nozzle for cover material
6 electron beam irradiating means
11 sealant layer
12 cover sheet layer
T pneumatic tire

BEST MODE FOR CARRYING OUT THE INVENTION

The sealant material that is used in the present invention can be a standard rubber composition that is used as a puncture sealant in pneumatic tires. The rubber component that is the main component of the rubber composition can be any type of rubber that is used in tire materials, such as one or more types of rubber including natural rubber, polyisobutylene (isobutylene rubber), butyl rubber (isobutylene-isoprene rubber), isoprene rubber, styrene-butadiene rubber, butadiene rubber, nitrile rubber, ethylene-propylene-diene ternary copolymer, and the like. Of these rubbers, butyl rubber is particularly preferable because its resistance to air permeability is more excellent than other rubbers. Note, if necessary, the sealant material made from butyl rubber can also contain polymers other than rubber, such as polybutene. Furthermore, an inorganic filler such as carbon black, silica, zinc oxide, or the like can be added to the rubber composition. In addition, if necessary, other additives such as stearic acid, paraffin oil, or the like can also be added.

An example of a preferable rubber composition has between 30 and 300 weight parts of polybutene, and has a suitable quantity of inorganic filler added to 100 weight parts of butyl rubber. Such a rubber composition can be decomposed beforehand by reacting with a peroxide, if necessary, in order to adjust the fluidity and the viscosity. Furthermore, the sealant material can also be made by drying and hardening a latex. The latex is preferably a natural rubber latex, but the latex can also be made by emulsifying and dispersing a synthetic rubber such as styrene-butadiene rubber (SBR) in water.

The cover material that is used for the present invention can be any unhardened rubber-based material or resin-based material. The rubber-based material can be, for example, a rubber component where a low molecular weight liquid polybutadiene, liquid polybutene, or liquid ethylene-propylene copolymer or the like is added to a high molecular weight diene-based elastomer, and is then blended with a sulfur-based cross-linking agent. As the resin-based material, polyamide-based resins (such as nylon 6, nylon 66, nylon 46, nylon 11, nylon 12, nylon 610, nylon 612, nylon 6/66 copolymer, nylon 6/66/610 copolymer, nylon MXD 6, nylon 6T, nylon 6/6T copolymer, nylon 66/PP copolymer, nylon 66/PPS copolymer, and N-alkoxyalkylated compounds thereof, such as methoxymethylated nylon 6, methoxymethylated nylon 6/610, and methoxymethylated nylon 612), polyester-based resins (aromatic polyesters such as polybutylene terephthalate, polyethylene terephthalate, polyethylene isophthalate, PET/PEI copolymer, polyarylate, polybutylene naphthalate, liquid crystal polyester, and polyoxyalkylene diimidic acid/polybutylene terephthalate copolymer), polynitrile-based resins (such as polyacrylonitrile, polymethacrylonitrile, acrylonitrile/styrene copolymer, and acrylonitrile/styrene/butadiene copolymer), polymethacrylate-based resins (such as poly (methylmethacrylate), and poly(ethylmethacrylate)), polyvinyl-based resins (such as vinyl acetate, polyvinyl alcohol, vinyl alcohol/ethylene copolymer, polyvinylidene chloride, polyvinyl chloride, vinyl chloride/vinylidene chloride copolymer, vinylidene chloride/methyl acrylate copolymer, vinylidene chloride/acrylonitrile copolymer), cellulose-based resins (such as cellulose acetate and cellulose acetate butyrate), fluorine-based resins (such as polyvinylidene fluoride, polyvinyl fluoride, polychlorofluoroethylene, tetrafluoroethylene/ethylene copolymer) and imide-based resins (such as aromatic polyimides) and the like can be suggested. Furthermore, if necessary, a filler such as carbon black and various types of additives can also be added to the cover material.

When applying the sealant material and cover material to the internal surface of the vulcanization molded pneumatic tire, the rotational speed applied to the pneumatic tire is not particularly restricted so long as the centrifugal force generated is sufficient to diffuse and spread the sealant material and the cover material uniformly, but is preferably between 650 and 1800 rpm, and more preferably between 800 and 1200 rpm. If the rotational speed is less than 650 rpm, uniformly diffusing and spreading may be difficult, and if greater than 1800 rpm, saturation will occur with regard to the effect obtained.

The viscosity of the sealant material and the cover material when diffusing and spreading into the form of a sheet by centrifugal force is preferably between 100 and 5000 Pa·s, and more preferably between 500 and 3000 Pa·s. If the viscosity of the sealant material and the cover material is less than 100 Pa·s, the sealant layer and the cover sheet layer will flow due to gravity when the rotation of the pneumatic tire is stopped, so maintaining the film thickness will not be possible, and variation will occur in the thickness of the sealant layer and the cover sheet layer. If the viscosity exceeds 5000 Pa·s, diffusing and spreading the sealant layer and cover sheet layer into a sheet form by centrifugal force will be difficult.

In addition to the aforementioned viscosity specifications of the sealing material and the cover material, the specific gravity of the sealant material is more preferably adjusted to a specific gravity that is larger than the specific gravity of the cover material. By adjusting the specific gravity in this manner, when the pneumatic tire is rotated, the two layers can be stably overlaid with the sealant layer on the external layer and the cover sheet layer on the internal layer, without interference occurring between the two materials.

The operation of injecting the sealant material and the cover material onto the internal surface of the pneumatic tire can both be performed using a spray nozzle. For both materials, spraying can be performed by spraying the sealant material as a viscous liquid, but spraying can also be performed by first freezing and pulverizing the sealant material into a powder form, and then spray injecting this powdered sealant material from a spray nozzle. The powdered and sprayed sealant material will adhere by impinging onto the internal surface of the vulcanized pneumatic tire either in a heated condition or at ambient temperature, and will easily form a sheet with uniform thickness.

FIG. 1 is a perspective view schematically showing an example of the production apparatus for a pneumatic tire according to the present invention.

In FIG. 1, 1 represents a rotational drive apparatus, and includes a support part 2 that grasps the vulcanized pneumatic tire T from the outer circumferential side using 3 arms 2a, and a drive shaft 3 that is connected to the center axis of the support part 2. The rotational drive apparatus 1 rotationally drives the pneumatic tire T around the tire axis by supporting the pneumatic tire T such that the drive shaft 3 and the tire axis are in line.

A spray nozzle for sealant material 4, a spray nozzle 5 for cover material, and electron beam irradiating means 6 are provided on the lateral part of the pneumatic tire T that is supported by the rotational drive apparatus 1, facing the opening part of the bead part. The spray nozzles 4, 5 and the electron beam irradiating means 6 are provided so that each can move independently back and forth alternatingly between the outside of the pneumatic tire T and a position inside the cavity. The electron beam irradiating means 6 is means for providing energy to harden the cover material, and can be replaced by an infrared ray irradiation means, ultraviolet ray irradiation means, or ultrasonic waves emitting irradiating means having a similar effect and function.

Figure 2A:
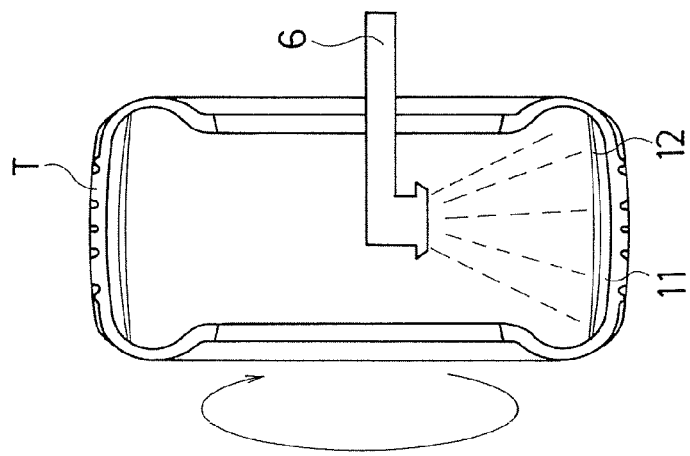
Figure 2B:
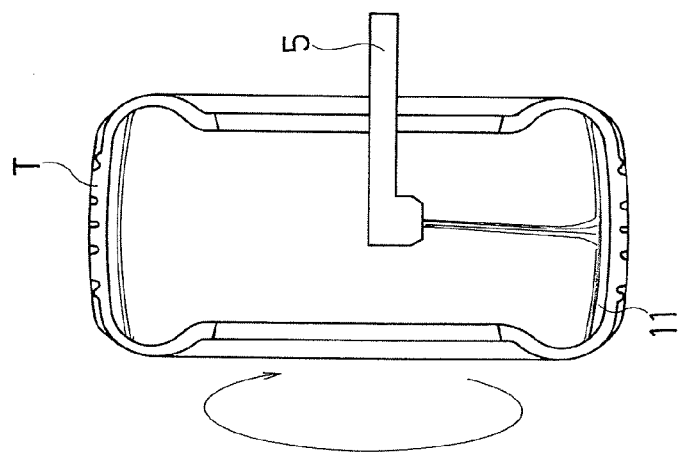
Figure 2C:
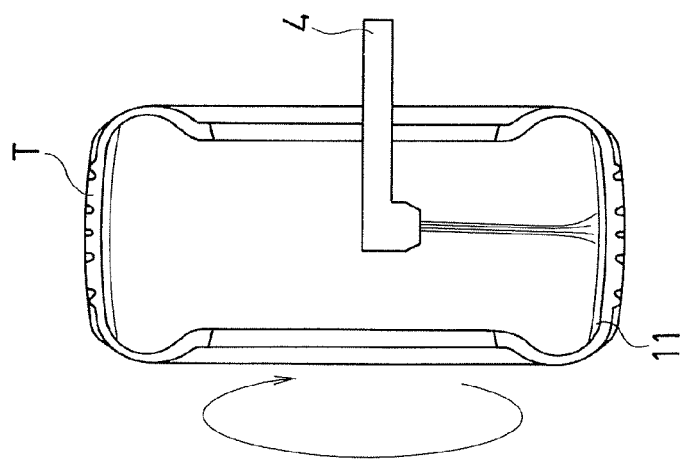

With the present invention, the self sealing pneumatic tire T is produced by the processes shown in FIG. 2A-C, using the aforementioned production apparatus shown in FIG. 1.

First, as shown in FIG. 2A, a vulcanization molded vulcanized pneumatic tire T is mounted on the tire support part 2, the spray nozzle for sealant material 4 is inserted into the tire cavity, and a predetermined quantity of sealant material is injected. The injection operation can be performed while the tire T is stopped, but injecting while rotating can shorten the time required for diffusing the sealant material.

If the tire T is rotated at high speed after injecting the sealant material or during injection, the sealant material will form a sealant layer 11 with essentially uniform thickness on the tire internal surface by diffusing and spreading by centrifugal force along the inside surface of the tread in the width direction of the tire and the circumferential direction of the tire. The rotational speed of the pneumatic tire T is preferably between 650 and 1800 rpm, as described above.

The thickness of the sealant layer 11 is not particularly restricted, but is preferably between 2 and 8 mm, more preferably between 3 and 7 mm. If the thickness is less than 2 mm, plugging a puncture hole with certainty when it becomes punctured by a nail or the like will be difficult, but if thicker than 8 mm, the hole plugging effect will not be affected, but the tire weight will increase, which is uneconomical.

Next, after retrieving the spray nozzle 4, as shown in FIG. 2B, the spray nozzle for cover material 5 is inserted into the tire cavity, and cover material is injected onto the inside surface of the sealant layer 11. This injection operation can be performed while rotating the tire T, or while stopped.

By rotating the tire T at high speed after or while injecting the cover material onto the sealant layer 11, the cover material will diffuse due to centrifugal force and form a cover sheet layer 12 with essentially uniform thickness in the width direction of the tire and the circumferential direction of the tire. The rotational speed of the tire at this time can be the same as that used for sealant material.

The thickness of the cover sheet layer 12 can be between $\frac{1}{5}$ and $\frac{1}{2}$ the thickness of the sealant layer 11. By making the thickness of the cover sheet layer 12 $\frac{1}{5}$ the thickness of the sealant layer 11 or thicker, after hardening the cover sheet layer, flow and maldistribution of the sealant layer can be suppressed. Even if the thickness of the cover sheet layer 12 is thicker than $\frac{1}{2}$ the thickness of the sealant layer 11, the aforementioned effect will have reached saturation but the tire weight will increase, which is uneconomical. The thickness of the coversheet layer 12 is preferably between 0.5 and 5 mm, more preferably between 0.5 and 3 mm.

After overlaying and forming the cover sheet layer 12 onto the sealant layer 11, the spray nozzle 5 is retracted, and as shown in FIG. 2C, the electron beam irradiating means 6 is inserted into the tire cavity, and the coversheet layer 12 is hardened by irradiation with an electron beam while rotating the tire T.

Afterwards, after retracting the electron beam irradiating means 6, a self-sealing pneumatic tire can be obtained by removing the pneumatic tire T from the rotational drive apparatus 1.

What is claimed is:

1. A method of producing a self-sealing pneumatic tire comprising the steps of:
   injecting a viscous sealant material onto an internal surface of a vulcanization molded pneumatic tire;
   rotating the pneumatic tire around a tire axis while forming the sealant material into a sealant layer diffused in a sheet form by centrifugal force,
   injecting a cover material comprising an unhardened rubber-based material or a resin-based material onto the internal surface of the sealant layer;
   rotating the pneumatic tire around the tire axis while forming the cover material into a cover sheet layer diffused in a sheet form by centrifugal force; and
   hardening the cover sheet layer by irradiating with an electron beam, infrared rays, ultraviolet rays, or ultrasonic waves.

2. The method of producing a self-sealing pneumatic tire according to claim 1, wherein a rotational speed of the pneumatic tire is between 650 and 1800 rpm.

3. The method of producing a self-sealing pneumatic tire according to claim 1, wherein viscosities of the sealant material and the cover material are between 100 and 5000 Pa·s.

4. The method of producing a self-sealing pneumatic tire according to claim 1, wherein a specific gravity of the sealant material is larger than a specific gravity of the cover material.

5. The method of producing a self-sealing pneumatic tire according to claim 1, wherein a thickness of the cover sheet layer is between $\frac{1}{5}$ and $\frac{1}{2}$ of a thickness of the sealant layer.

6. The method of producing a self-sealing pneumatic tire according to claim 1, wherein the sealant material is powdered by freeze pulverizing prior to injection, and the sealant material is injected by spraying.

* * * * *